US010045309B2

(12) United States Patent
Uematsu (10) Patent No.: US 10,045,309 B2
(45) Date of Patent: Aug. 7, 2018

(54) INFORMATION PROCESSING APPARATUS AND INFORMATION PROCESSING METHOD

(71) Applicant: TOSHIBA TEC KABUSHIKI KAISHA, Tokyo (JP)

(72) Inventor: Kaoru Uematsu, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/432,043

(22) Filed: Feb. 14, 2017

(65) Prior Publication Data

US 2017/0311270 A1 Oct. 26, 2017

(30) Foreign Application Priority Data

Apr. 26, 2016 (JP) .................. 2016-088265

(51) Int. Cl.
| | | |
|---|---|---|
| *H04B 7/00* | (2006.01) | |
| *H04W 52/28* | (2009.01) | |
| *H04L 29/06* | (2006.01) | |
| *H04W 68/00* | (2009.01) | |
| *G06F 3/12* | (2006.01) | |

(Continued)

(52) U.S. Cl.
CPC .......... *H04W 52/28* (2013.01); *G06F 1/3209* (2013.01); *G06F 1/3284* (2013.01); *G06F 3/1211* (2013.01); *G06F 3/1236* (2013.01); *G06F 3/1292* (2013.01); *H04L 69/28* (2013.01); *H04W 4/80* (2018.02); *H04W 68/00* (2013.01); *H04W 76/38* (2018.02)

(58) Field of Classification Search
CPC ..... H04W 4/008; H04W 88/06; H04W 8/005; H04W 84/18; H04W 48/16; H04W 76/04; H04W 92/02; H04W 72/1215
See application file for complete search history.

(56) References Cited

U.S. PATENT DOCUMENTS 9,625,884 B1* 4/2017 Ousley ............... G05B 13/0205
9,645,777 B2* 5/2017 Kikuchi ............... G06F 3/1226
(Continued)

FOREIGN PATENT DOCUMENTS

| EP | 2645226 A2 | 10/2013 |
|---|---|---|
| JP | 2014-155030 | 8/2014 |

OTHER PUBLICATIONS

Extended European Search Report dated Jul. 6, 2017, filed in European counterpart Patent Application No. 1716477.9 (10 pages).

*Primary Examiner* — Edward Urban
*Assistant Examiner* — Max Mathew
(74) *Attorney, Agent, or Firm* — Patterson & Sheridan, LLP (57) ABSTRACT

According to an embodiment, an information processing apparatus includes an operation device and a controller. The operation device receives an instruction to turn off a power supply from a power supply device. when the operation device receives the instruction to turn off the power supply from the power supply device, the controller transmits a request of disconnection of the communication to the external apparatus. Further, the controller turns off the power supply from the power supply device after waiting for a predetermined time period after the transmission of the disconnection request.

9 Claims, 8 Drawing Sheets

(51) Int. Cl.
    *G06F 1/32*     (2006.01)
    *H04W 4/80*     (2018.01)
    *H04W 76/38*     (2018.01)

(56) References Cited

U.S. PATENT DOCUMENTS

| | | |
|---|---|---|
| 2014/0113690 A1* | 4/2014 | Shanmugasundaram .................. H04W 52/0251 455/574 |
| 2015/0153978 A1 | 6/2015 | Ito |
| 2015/0254030 A1 | 9/2015 | Taniguchi et al. |
| 2016/0011830 A1* | 1/2016 | Asakura ................ H04W 76/10 358/1.15 |
| 2016/0147491 A1* | 5/2016 | Miyasaka ............ G06Q 20/209 358/1.16 |
| 2016/0286344 A1* | 9/2016 | Terashita ............... H04W 4/008 |
| 2017/0061267 A1* | 3/2017 | Wakasa .................... H04N 1/41 |
| 2017/0123739 A1* | 5/2017 | Konji .................... G06F 3/1236 |
| 2017/0201635 A1* | 7/2017 | Takamoto ........... H04L 43/0876 |
| 2017/0208214 A1* | 7/2017 | Asakura ............... H04N 1/4433 |

* cited by examiner

INFORMATION PROCESSING APPARATUS AND INFORMATION PROCESSING METHOD

CROSS-REFERENCE TO RELATED APPLICATIONS

This application is based upon and claims the benefit of priority from the prior Japanese Patent Application No. 2016-088265, filed on Apr. 26, 2016, the entire contents of which are incorporated herein by reference.

FIELD

An embodiment described here generally relates to an information processing apparatus and an information processing method.

BACKGROUND

In the past, a plurality of apparatuses has been wirelessly connected. For example, in communication with Bluetooth (registered trademark), an apparatus that operates as a master accesses an apparatus that operates as a slave, and pairing is performed between the two apparatuses, thereby establishing communication.

Further, these days, apparatuses using a technology such as scatternet, which is capable of operating as a master and a slave that receives an access from another apparatus, are known. Furthermore, for a slave apparatus, there has been proposed the technology for accessing a lastly connected connection destination on the basis of information that indicates the connection destination along with turning on a power.

Incidentally, in an apparatus (first apparatus) that operates as a master, when an apparatus (second apparatus) that operates as a slave is brought into a state in which communication is impossible by turning off the power or the like, by transmitting a keepalive signal or the like, the communication (session) is maintained for a predetermined time. In this case, the first apparatus that operates also as the slave cannot establish new communication during the time when the preceding communication is maintained, even if the first apparatus receives an access from the second apparatus restored by turning on the power. For this reason, there is a problem in that, in the second apparatus, even if the first apparatus is accessed at a time of reboot or the like that power-off and power-on are performed in a short time, it is impossible to perform reconnection to the first apparatus till time-out of the preceding communication.

DETAILED DESCRIPTION

According to an embodiment, an information processing apparatus is an information processing apparatus that establishes wireless communication with an external apparatus in response to a communication request from the external apparatus. The information processing apparatus includes a power supply device, an operation device, a communication interface, and a controller. The power supply device supplies power to each unit of the information processing apparatus. The operation device receives an instruction to turn off a power supply from the power supply device. The communication interface establishes communication with the external apparatus. The controller transmits a request of disconnection of the communication to the external apparatus through the communication interface when the operation device receives the instruction to turn off the power supply from the power supply device. Further, the controller turns off the power supply from the power supply device after waiting for a predetermined time after the transmission of the disconnection request.

Hereinafter, an information processing apparatus and an information processing method according to embodiments will be further described with reference to the drawings. The embodiments described below are an example in which a printer apparatus is applied as the information processing apparatus. However, the information processing apparatus according to the embodiments is not limited to the printer apparatus. In the drawings, the same reference numerals and symbols denote the same or similar parts.

First Embodiment

Figure 1:
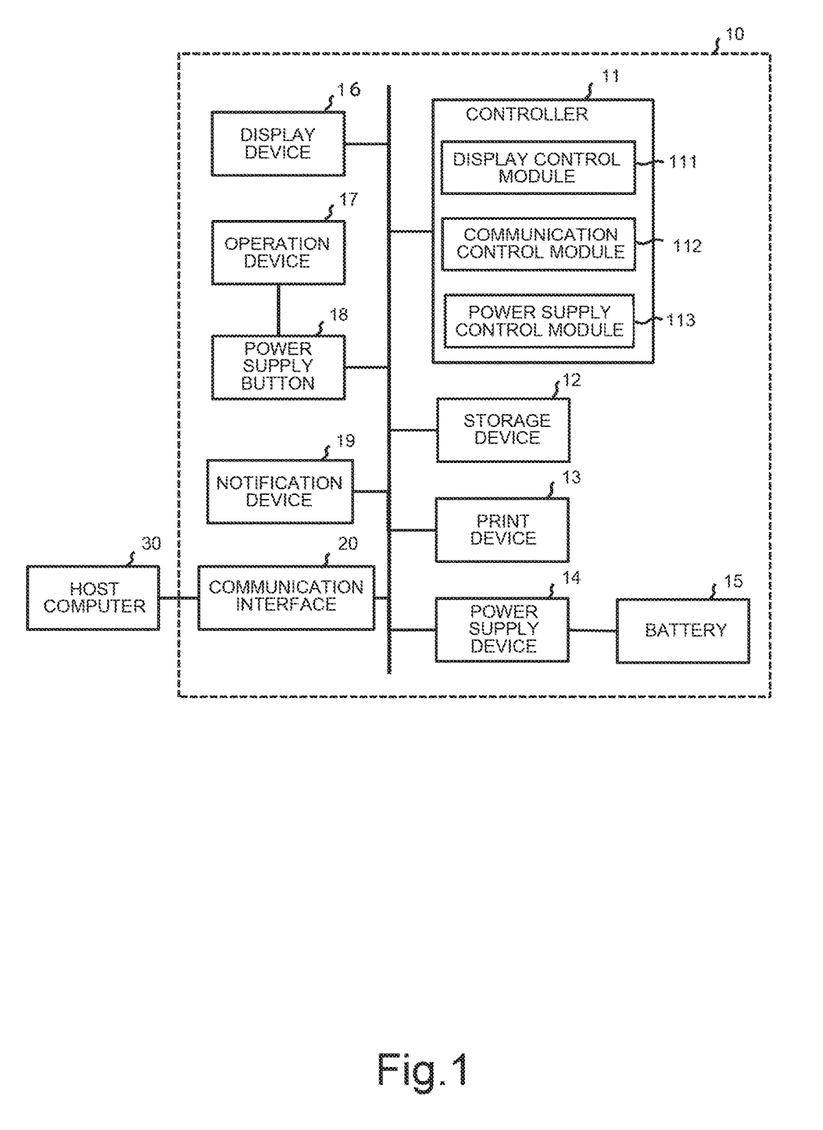
FIG. 1 is a block diagram showing an example of a printer apparatus according to a first embodiment.

FIG. 1 is a block diagram showing an example of a printer apparatus according to a first embodiment. A printer apparatus 10 includes a controller 11. The controller 11 has a computer configuration including a CPU (Central Processing Unit) or a SoC (System-on-a-Chip), a ROM (Read Only Memory), a RAM (Random Access Memory), and the like. Further, the controller 11 includes a timing apparatus such as an RTC (Real Time Clock) (not shown).

Further, to the controller 11, a storage device 12 is connected via a bus or the like. The storage device 12 is a storage apparatus such as an HDD (Hard Disk Drive) or a flash memory. The storage device 12 stores operation programs executed by the controller 11 and data used to execute the operation program.

Further, to the controller 11, a print device 13 and a power supply device 14 are connected via the bus or the like. The print device 13 is a printer engine such as a thermal printer and a dot impact printer. The power supply device 14 supplies power stored in a battery 15 to each of units of the printer apparatus 10. The power supply device 14 is not limited to the battery 15 and may be a commercially available power supply. It should be noted that, in the following description, turning on of the power supply by the power supply device 14 may be simply referred to as turning on a power or power-on in some cases. Further, turning off of the power supply by the power supply device 14 may be simply referred to as turning off a power or power-off in some cases. A power-off process is performed after the printer apparatus 10 terminates a system operation in execution. That is, the power-off process includes so-called shutdown.

Further, to the controller 11, via the bus or the like, a display device 16, an operation device 17, a notification device 19, and a communication interface (I/F) 20 are connected. The display device 16 is a display device such as a liquid crystal display.

The operation device 17 has various operators for receiving an operation input from a user. The operation device 17 includes, for example, a power supply button 18 for giving an instruction to perform power-on or power-off of the printer apparatus 10. It should be noted that in this embodiment, the controller 11 performs the power-off process to be described later in accordance with an operation of power-off through the power supply button 18. Accordingly, the power supply button 18 does not turn off the power by directly cutting off electrical connection but notifies the controller 11 of a power-off instruction to cause the controller 11 to turn off the power. For example, by holding down the power supply button 18, the power supply button 18 notifies the controller 11 of the power-off instruction.

The notification device 19 is a sound output apparatus capable of outputting sounds. Under the control by the controller 11, the notification device 19 outputs a sound such as a beep sound, and thus sends a notification to a user. It should be noted that the notification device 19 is not limited to the sound output apparatus. For example, the notification device 19 may be a light-emitting apparatus such as an indicator lamp.

The communication interface 20 is an interface for performing communication with a host computer 30. In this embodiment, the communication interface 20 communicates with the communication interface provided to the host computer 30 with Bluetooth (registered trademark).

The host computer 30 is, for example, an information equipment such as a smartphone, a tablet terminal, a personal computer (PC), and a handy terminal. The host computer 30 has a controller including a computer configuration including a CPU, a ROM, a RAM, and the like (not shown). The controller operates in cooperation with a predetermined operating system (OS) stored in a storage apparatus such as an HDD, thereby performing various computation processes.

Further, the host computer 30 has a communication interface that allows near field communication by Bluetooth (registered trademark), and operates as a master in the communication. More specifically, the host computer 30 searches for the printer apparatus 10 that operates as the slave, and performs an access to request the printer apparatus 10 to perform communication. Then, the host computer 30 establishes communication by paring with the printer apparatus 10 as an access destination. When the communication is established with the printer apparatus 10, the host computer 30 transmits and receives various pieces of information to and from the printer apparatus 10. For example, the host computer 30 transmits print data (image data or the like) to be printed to the printer apparatus 10 in accordance with an operation input by a user.

Further, the host computer 30 in this embodiment operates as the master described above and also operates as a slave that receives an access from another apparatus. Both of the operations as the master and slave can be achieved by a technology called scatternet, for example. The host computer 30 operates as the slave, and thus when receiving an access from the printer apparatus 10, for example, the host computer 30 pairs with the printer apparatus 10, thereby establishing communication. Hereinafter, a function of achieving both of the master and slave is referred to as a scatternet function.

In the printer apparatus 10 described above, the controller 11 executes operation programs stored in the storage device 12 to perform overall control for the operations of the printer apparatus 10. For example, the controller 11 temporarily stores the print data received from the host computer 30 in a RAM or the storage device 12. Further, the controller 11 controls the print device 13 to cause the print device 13 to print the print data temporarily stored.

Further, as shown in FIG. 1, the controller 11 of the printer apparatus 10 has function modules such as a display control module 111, a communication control module 112, and a power supply control module 113. The function modules are achieved as software by executing programs stored in the storage device 12 or achieved as hardware by dedicated processors or the like of the controller 11.

The display control module 111 controls the display device 16 to cause the display device 16 to display various pieces of information such as a print status. Further, the display control module 111 operates in cooperation with the power supply control module 113, to cause the display device to display various pieces of information relating to power-off control.

The communication control module 112 is a function module corresponding to a communication control means in this embodiment. The communication control module 112 operates in cooperation with the communication interface 20, thereby controlling communication with the host computer 30. More specifically, communication control module 112 pairs with the host computer 30 in accordance with the access from the host computer 30, thereby establishing wireless communication with the host computer 30. Further, the communication control module 112 causes the storage device 12 to store connection destination information (for example, BD_ADDR) that indicates a connection destination of the host computer 30 with which the communication is established. Then, when the printer apparatus 10 is powered on, the communication control module 112 accesses the connection destination of the address information on the condition that the connection destination information is stored in the storage device 12.

As described above, the printer apparatus 10 accesses the connection destination information stored in the storage device 12, thereby performing reconnection with the host computer 30 to which the printer apparatus has been connected till power-off. It should be noted that in the case where the address information is not stored in the storage device 12 and in the case where communication cannot be established with the connection destination indicated by the connection destination information, the printer apparatus 10 (communication control module 112) operates as the slave. It should be noted that, the access from the printer apparatus 10 to the host computer 30 may be achieved by the scatternet function described above.

Incidentally, in the past, in the apparatus (first apparatus) that operates as the master, when the apparatus (second apparatus) that operates as the slave is in a communication impossible state due to power-off or the like, by transmitting a keepalive signal or the like, the communication (session) is maintained for a predetermined time. In this case, the first apparatus that operates also as the slave cannot establish new communication during when the preceding communication is maintained, even if the first apparatus receives an access from the second apparatus restored by power-on. For this reason, there is a problem in that the second apparatus cannot perform reconnection with the first apparatus till time-out of the preceding communication, even when the second apparatus accesses the first apparatus at a time of reboot or the like that power-off and power-on are performed in a short time.

In view of this, in order to cope with the problem described above, the printer apparatus 10 in this embodiment has the power supply control module 113. Hereinafter, a description will be given on the power supply control module 113.

The power supply control module 113 is a function module corresponding to a reception means, a transmission means, and a control means in this embodiment. The power supply control module 113 operates in cooperation with the power supply button 18, and thus receives a power-off instruction. Upon reception of the power-off instruction, the power supply control module 113 operates in cooperation with the communication control module 112 and transmits a disconnection request to the host computer 30 with which the communication is established. Here, the disconnection request is a command or the like for requesting disconnection (termination) of communication. Upon reception of the disconnection request from the printer apparatus 10, the host computer 30 sends a reply such as acknowledge (ACK), and then disconnects the communication with the printer apparatus 10.

As described above, when the power-off instruction is given, the power supply control module 113 transmits the disconnection request to the host computer 30, and thus the communication between the printer apparatus 10 and the host computer 30 is terminated. As a result, the printer apparatus 10 can prevent the communication with the printer apparatus 10 from being unintentionally maintained in the host computer 30 after the power-off. Thus, the printer apparatus 10 accesses the host computer 30 on the basis of the connection destination information, and thus can be reconnected with the host computer 30 without waiting for time-out of the preceding communication.

Further, after transmitting the disconnection request, the power supply control module 113 waits for a predetermined waiting time (hereinafter, referred to as power-off waiting time). After that, by controlling the power supply device 14, the power supply control module 113 turns off the power of the printer apparatus 10. Here, the power-off includes shutdown as described above.

It should be noted that the power-off waiting time is not particularly limited and can be set to an arbitrary value. For example, the power-off waiting time may be a preset fixed value, for example, one second. In this case, it is desirable that the fixed value be a value depending on a processing time necessary to disconnect the communication in the host computer 30. Further, the power-off waiting time may be a time from when the printer apparatus 10 transmits the disconnection request to the host computer 30 until the printer apparatus 10 receives a reply (ACK or the like) from the host computer 30. Further, the power-off waiting time may be a time from when the printer apparatus 10 transmits the disconnection request to the host computer 30 until the communication interface 20 detects an offline with the host computer 30. It should be noted that, in this embodiment, a description will be given on the assumption that the power-off waiting time is a preset fixed value.

As described above, after transmitting the disconnection request, the power supply control module 113 waits for the power-off waiting time, to wait till a reliable completion of the disconnection of the communication on the host computer 30 side. As a result, even in the case where the reboot or the like that power-off and power-on are performed in a short time is performed, the printer apparatus 10 can be reconnected with the host computer 30 smoothly.

Further, on the condition that the power-off instruction is given, the power supply control module 113 causes the notification device 19 to operate, thereby notifying reception of the power-off instruction. Specifically, the power supply control module 113 outputs sound (beep sound) at a time of an elapse of a predetermined time (hereinafter, notification waiting time) after the power-off instruction is given, thereby performing notification. It should be noted that the notification waiting time is set to be shorter than the power-off waiting time (notification waiting time<power-off waiting time). For example, in the case where the power-off waiting time is one second, the power supply control module 113 outputs sound after 0.5 second (notification waiting time) from when timing of the power-off waiting time is started, thereby notifying a user of the reception of the power-off instruction. It should be noted that the notification waiting time is not limited to this. For example, by setting the notification waiting time to zero, the notification may be performed at a time when counting of the notification waiting time is started. Further, by setting the notification waiting time to ⅓ or ½ of the power-off waiting time, the notification may be performed at a time when ⅓ or ½ of the power-off waiting time elapses.

As described above, the power supply control module 113 notifies the reception of the power-off instruction by beep sound or the like during the power-off waiting time. As a result, the printer apparatus 10 can cause a user to recognize that a power-off operation is correctly input. Further, the printer apparatus 10 can relax a sense of discomfort of a user resulting from waiting for the power-off waiting time.

Figure 3:
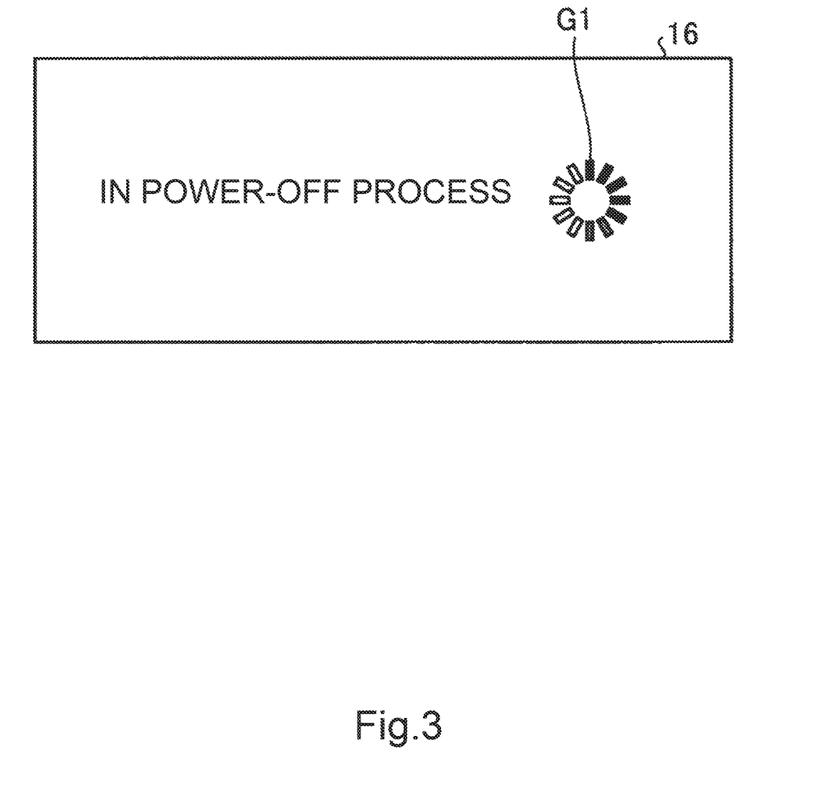
FIG. 3 is a diagram showing an example of the notification screen of the printer apparatus according to the first embodiment.
Figure 4:
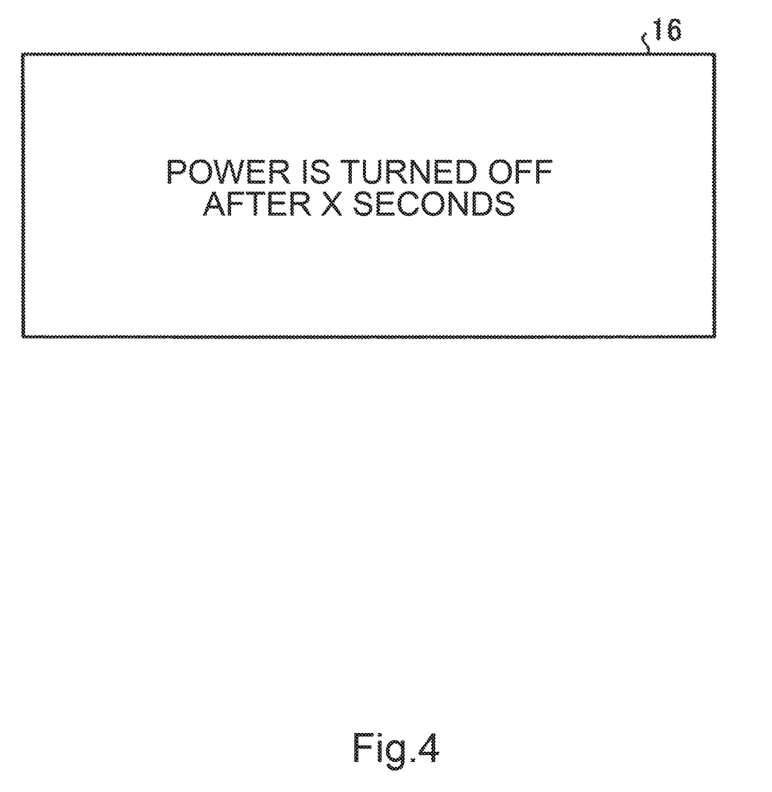
FIG. 4 is a diagram showing an example of the notification screen of the printer apparatus according to the first embodiment.

It should be noted that, the notification method is not limited to sound, and another method may be used. For example, the power supply control module 113 operates in cooperation with the display control module 111, and thus may notify the reception of the power-off instruction by screen displaying (on a notification screen). Here, FIGS. 2 to 4 are diagrams each showing an example of the notification screen.

Figure 2:
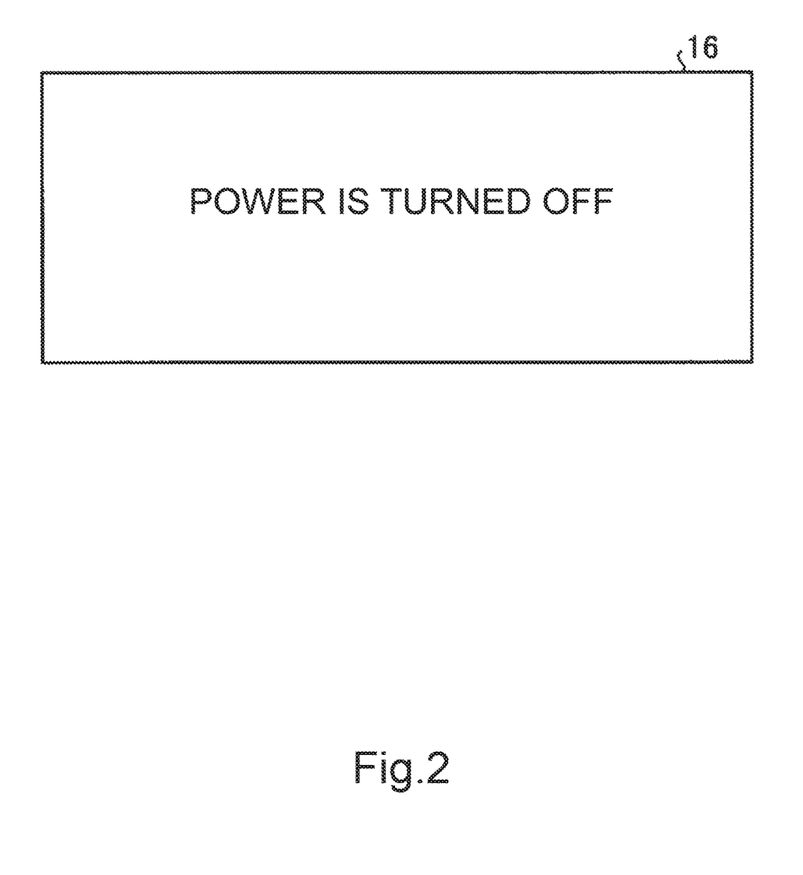
FIG. 2 is a diagram showing an example of a notification screen of the printer apparatus according to the first embodiment.

For example, as shown in FIG. 2, the power supply control module 113 may display a message of "power is turned off" or the like on the display device 16, thereby notifying the reception of the power-off instruction. Further, as shown in FIG. 3, the power supply control module 113 may display a loading image G1 with a message of "in power-off process" as an indication of during the power-off process on the display device 16, thereby notifying the reception of the power-off instruction. Further, as shown in FIG. 4, the power supply control module 113 may display a message of "power is turned off after X seconds" or the like on the display device 16, thereby notifying a counting status of the power-off waiting time. In addition, the power supply control module 113 may display countdown, a progress bar, or the like that indicates the counting status of the power-off waiting time on the display device 16, thereby notifying the reception of the power-off instruction. It should be noted that timing when the notification screen is displayed is not particularly limited and may be the same timing as the notification by the sound described above. Further, the notification screen may be displayed at the same time when the counting of the power-off waiting time is started.

As described above, the power supply control module 113 notifies the reception of the power-off instruction by the screen display. As a result, the printer apparatus 10 can cause a user to recognize that the power-off operation is correctly input. Further, the printer apparatus 10 can notify a time to the power-off, with the result that it is possible to improve convenience of a user.

Subsequently, with reference to FIG. 5 and FIG. 6, a description will be given on an example of the operation of the printer apparatus 10 described above.

Figure 5:
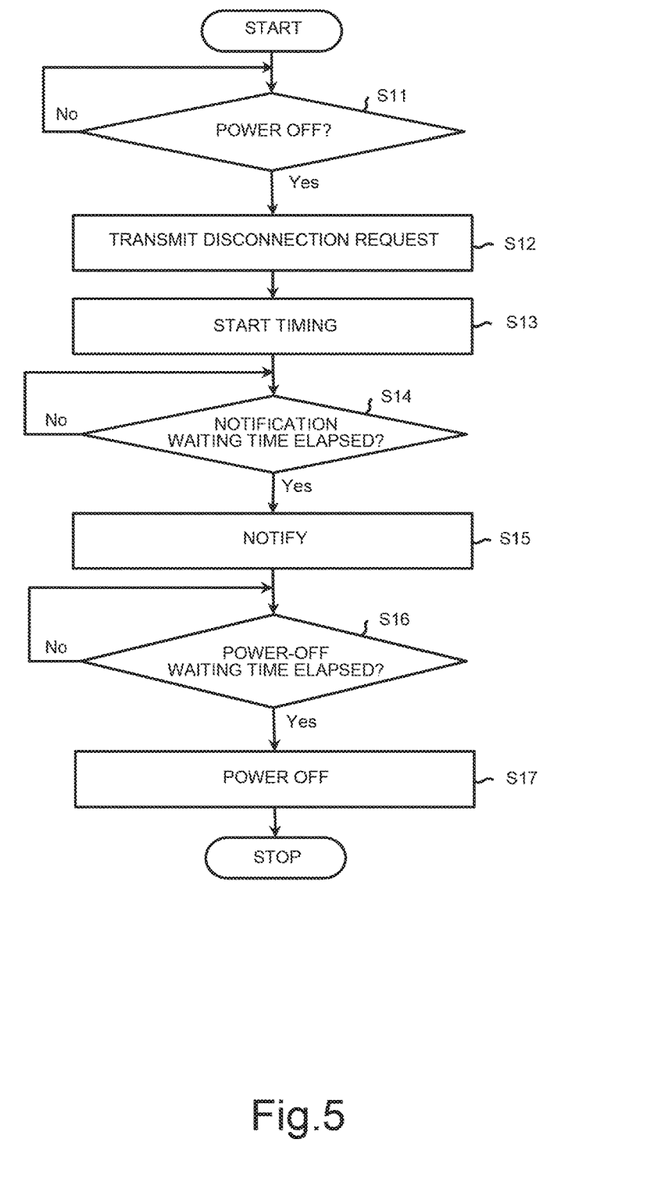
FIG. 5 is a flowchart showing an example of a process of turning off a power performed by the printer apparatus according to the first embodiment.

FIG. 5 is a flowchart showing an example of the power-off process performed by the printer apparatus 10. It should be noted that the assumption is made that the communication is established between the printer apparatus 10 that operates as the slave and the host computer 30 that operates as the master in this process.

First, in Step S11 shown in FIG. 5, the controller 11 (power supply control module 113) waits until the power-off is instructed by an operation with the power supply button 18 (No in Step S11). When the power-off is instructed by holding the power supply button 18 down (Yes in Step S11), the process of the controller 11 proceeds to Step S12. In Step S12, the controller 11 (power supply control module 113) operates in cooperation with the communication control module 112, and transmits the disconnection request to the host computer 30. Then, in Step S13, the controller 11 (power supply control module 113) starts timing in accordance with the power-off instruction.

Subsequently, in Step S14, the controller 11 (power supply control module 113) waits until the elapsed time reaches the notification waiting time (for example, 0.5 second) (No in Step S14). When the elapsed time reaches the notification waiting time (Yes in Step S14), the process of the controller 11 proceeds to Step S15. In Step S15, the controller 11 (power supply control module 113) outputs sound or the notification screen, thereby notifying the reception of the power-off instruction.

Subsequently, in Step S16, the controller 11 (power supply control module 113) waits until the elapsed time reaches the power-off waiting time (for example, one second) (No in Step S16). When the elapsed time reaches the power-off waiting time (Yes in Step S16), the process of the controller 11 proceeds to Step S17. In Step S17, the controller 11 (power supply control module 113) turns off the power of the printer apparatus 10, and terminates this process.

Figure 6:
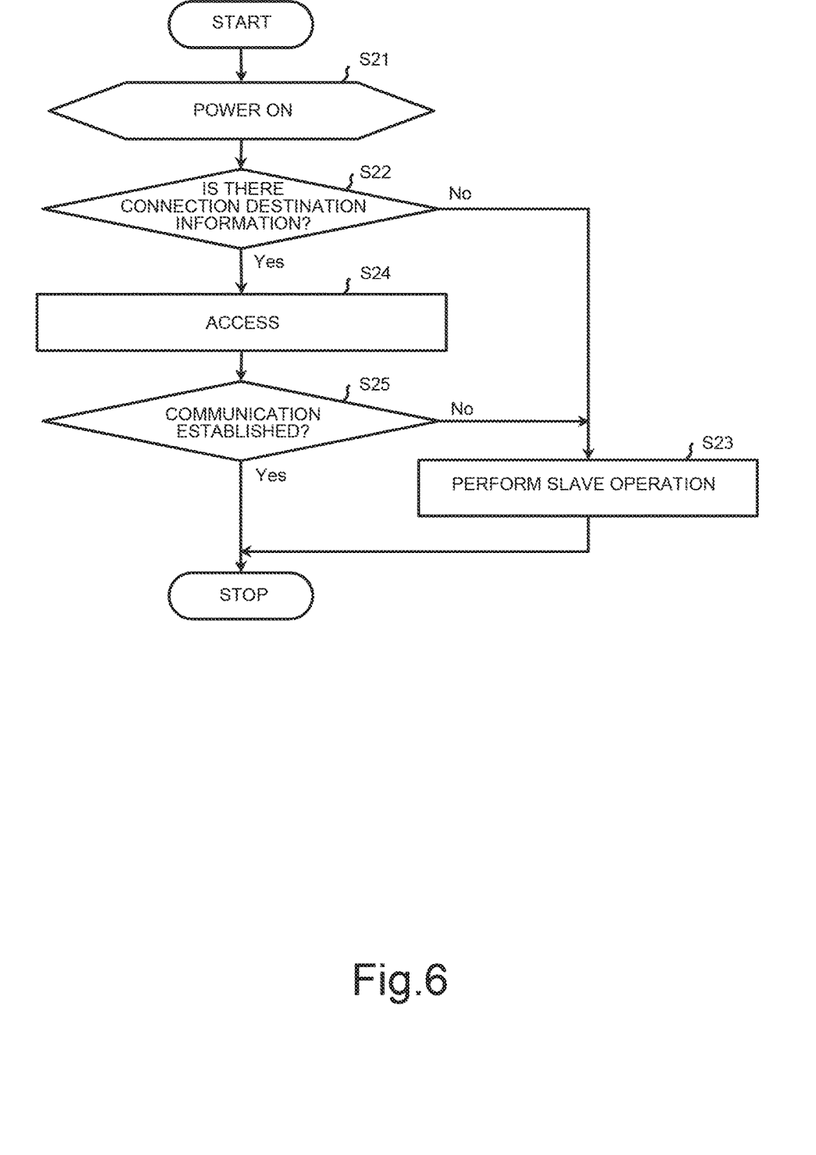
FIG. 6 is a flowchart showing an example of a process of reconnection performed by the printer apparatus according to the first embodiment.

FIG. 6 is a flowchart showing an example of a reconnection process performed by the printer apparatus 10. In Step S21 of FIG. 6, the controller 11 determines that the printer apparatus 10 is powered on. Then, in Step S22, the controller 11 (communication control module 112) determines whether connection destination information is stored in the storage device 12 or not.

In Step S22, in the case where the connection destination information is not stored in the storage device (No in Step S22), the process of the controller 11 proceeds to Step S23. In Step S23, the controller (communication control module 112) causes the own apparatus to operate as the slave, and terminates this process.

On the other hand, in Step S22, in the case where the connection destination information is stored in the storage device 12 (Yes in Step S22), the process of the controller 11 proceeds to Step S24. In Step S24, the controller 11 (communication control module 112) accesses the connection destination (host computer 30) indicated by the connection destination information. Then, in Step S25, the controller 11 (communication control module 112) determines whether the communication with the connection destination is established or not.

In Step S25, in the case where the communication with the connection destination cannot be established (No in Step S25), the process of the controller 11 proceeds to Step S23. In Step S23, as described above, the controller 11 causes the own apparatus to operate as the slave.

Further, in Step S25, in the case where the communication with the connection destination is established (Yes in Step S25), the controller 11 (communication control module 112) maintains the communication state, and terminates this process. In this case, the printer apparatus 10 operates as the master, and the host computer 30 operates as the slave. It should be noted that, when the communication is established in Step S25, the communication control module 112 may overwrite the connection destination information of the connection destination in the storage device 12. Further, when the own apparatus operates as the slave, the communication control module 112 may store (overwrite) the connection destination information.

As described above, when the power-off instruction is given, the printer apparatus 10 in this embodiment terminates the communication with the host computer 30 by transmitting the disconnection request. Further, after transmitting the disconnection request, the printer apparatus 10 waits for the power-off waiting time, and then turns off the power. As a result, when the power is turned on again, the printer apparatus 10 can establish the communication with the host computer 30 without waiting for the time-out of the preceding communication. Thus, it is possible to perform smooth reconnection.

It should be noted that in the power-off process shown in FIG. 5, the example is described in which the disconnection request is transmitted on the basis of the power-off operation through the power supply button 18, but the embodiment is not limited to this. For example, the power supply control module 113 may perform the processes of Steps S12 to S17 described above in the case where the power is automatically turned off due to a reduction or the like of a remaining battery level of the battery 15.

Second Embodiment

Subsequently, a second embodiment will be described. In the first embodiment, the host computer 30 has the scatternet function. However, depending on types of the host computer 30, the host computer 30 dedicated to the master operation with no scatternet function also exists. Here, the types of the host computer 30 include a type or a version of an OS installed in the host computer 30, a type or a version of a communication interface, and the like.

In the case where the host computer 30 exclusively performs the master operation, when accessed by the printer apparatus 10, the communication cannot be established. Therefore, the host computer 30 accesses the printer apparatus 10 to be connected thereto anew. Thus, in the case where the host computer 30 exclusively performs the master operation, the printer apparatus 10 does not have to transmit the disconnection request and wait for the power-off waiting time.

In view of this, in the second embodiment, a mode will be described in which details of the power-off process can be switched depending on the types of the host computer 30. It should be noted that the same components as in the printer apparatus 10 described in the first embodiment will be denoted by the same reference numerals, and descriptions thereof will be omitted.

Figure 7:
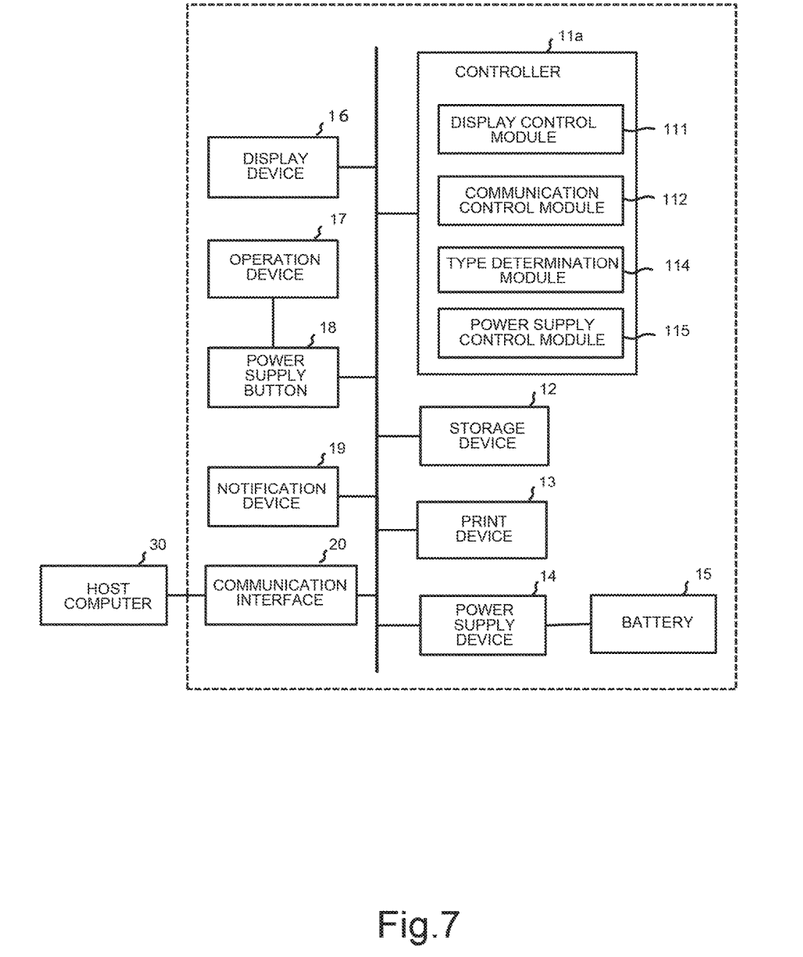
FIG. 7 is a block diagram showing an example of a printer apparatus according to a second embodiment.

FIG. 7 is a block diagram showing an example of the configuration of a printer apparatus according to the second embodiment. A printer apparatus 10a has a hardware configuration similar to the printer apparatus 10 described with reference to FIG. 1. Further, as shown in FIG. 7, a controller 11a of the printer apparatus 10a includes function modules such as the display control module 111, the communication control module 112, a type determination module 114, and a power supply control module 115. The function modules are achieved as software by executing programs stored in the storage device 12 or achieved as hardware by dedicated processors or the like of the controller 11a.

The type determination module 114 operates in cooperation with the communication control module 112, thereby determining the type of the host computer 30 with which the communication is established. Here, the type determination method for the host computer 30 is not particularly limited. For example, the type determination module 114 may determine the type of the host computer 30 on the basis of information that indicates the type included in information transmitted from the host computer 30. Further, the type determination module 114 may request the information that indicates the type to the host computer 30, and determine the type of the host computer 30 on the basis of the information provided in response to the request. Further, the type determination module 114 may determine the type of the host computer 30 on the basis of a paring method with the host computer 30, a communication protocol, or the like.

On the basis of a determination result of the type determination module 114, the power supply control module 115 determines whether the host computer 30 as the connection destination is an apparatus equipped for the scatternet function. More specifically, on the basis of a setting table in which types of the host computer 30 and presence or absence of the scatternet function are associated, the power supply control module 115 determines whether the determined type is equipped for the scatternet function or not.

In the case where the host computer 30 is equipped for the scatternet function, on the condition that the power-off instruction is given, the power supply control module 115 performs a similar process as in the first embodiment. Specifically, after transmitting the disconnection request to the host computer 30, the power supply control module 115 waits for the power-off waiting time, and then turns off the power of the printer apparatus 10a. Further, in the case where the host computer 30 is not equipped for the scatternet function, on the condition that the power-off instruction is given, the power supply control module 115 turns off the power of the printer apparatus 10a. As described above, in accordance with the type of the host computer 30, the power supply control module 115 determines whether the disconnection request is transmitted or not.

Figure 8:
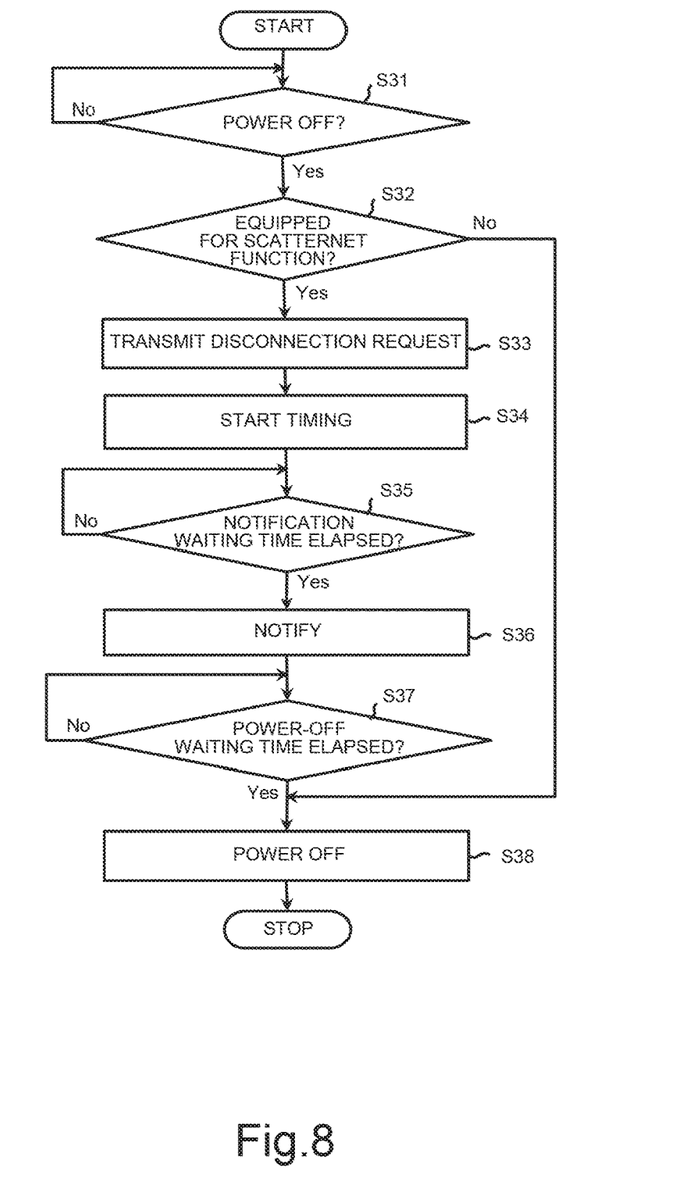
FIG. 8 is a flowchart showing an example of a process of turning off a power performed by the printer apparatus according to the second embodiment.

Subsequently, with reference to FIG. 8, an example of the operation of the printer apparatus 10a will be described. FIG. 8 is a flowchart showing an example of a power-off process performed by the printer apparatus 10a. It should be noted that the assumption is made that the communication is established between the printer apparatus 10a that operates as the slave and the host computer 30 that operates as the master. Further, the assumption is made that the type of the host computer 30 is determined by the type determination module 114.

First, in Step S31 of FIG. 8, the controller 11a (power supply control module 115) waits until the power-off instruction is given by the operation of the power supply button 18 (No in Step S31). Here, when the fact that the power-off instruction is given by holding down the power supply button 18 is detected (Yes in Step S31), the process of the controller 11a proceeds to Step S32. In Step S32, the controller 11a (power supply control module 115) determines whether the computer 30 is equipped for the scatternet function on the basis of the determination result of the type determination module 114.

In the case where the host computer 30 is not equipped for the scatternet function (No in Step S32), the process of the controller 11a proceeds to Step S38. In Step S38, the controller 11a (power supply control module 115) turns off the power. Further, in the case where the host computer 30 is equipped for the scatternet function (Yes in Step S32), the process of the controller 11a proceeds to Step S33. In Step S33, the controller 11a (power supply control module 115) transmits the disconnection request to the host computer 30.

Subsequently, the controller 11a (power supply control module 115) performs the process of Steps S34 to S38 and terminates this process. It should be noted that the process of Steps S34 to S38 is similar to the process of Steps S13 to described with reference to FIG. 5, so a description thereof will be omitted.

As described above, when the power-off instruction is given, the printer apparatus 10a in this embodiment determines whether the type of the host computer 30 is equipped for the scatternet function or not. In the case where the host computer 30 is equipped for the scatternet function, the printer apparatus 10a turns off the power in a process similar to that in the first embodiment. Further, in the case where the host computer 30 is not equipped for the scatternet function, the printer apparatus 10a does not transmit the disconnection request and wait for the power-off waiting time, and turns off the power. As a result, the printer apparatus 10a can turn off the power by the method appropriate to the type of the host computer 30.

It should be noted that in the power-off process shown in FIG. 8, in response to the power-off instruction, it is determined whether host computer 30 is equipped for the scatternet function or not. However, a timing when the determination is performed is not limited to this. For example, the power supply control module 115 may determine whether the type of the host computer 30 is equipped for the scatternet function or not before the power-off instruction is received. Further, the power supply control module 115 may determine whether the host computer 30 is equipped for the scatternet function or not at a time when the type of the host computer 30 is determined by the type determination module 114.

Further, in this embodiment, the scatternet is cited as an example of the technology (function) capable of establishing the communication in response to the request from the slave. However, instead of this technology, another technology may be used. It should be noted that even in the case where a technology (function) other than the scatternet is used, by determining whether the host computer 30 is ready for the function or the like, the same effect as this embodiment can be obtained.

In the above embodiments, the description is given on the example in which the printer apparatus 10 (10a) is applied as the information processing apparatus, but an apparatus as an application target is not limited to this. The information processing apparatus according to the embodiment may be applied to the host computer 30, for example. Specifically, the type of the information processing apparatus according to the embodiment is not particularly limited, as long as the apparatus can achieve the operations (functions) of the master and slave at the same time or at different times.

Further, in the above embodiments, the controller 11 (communication control module 112) automatically accesses the external apparatus (host computer 30) on the basis of the connection destination information stored in the storage device 12, but may access the external apparatus in accordance with an operation by a user instead. For example, the communication control module 112 searches for external apparatuses that operate as the slaves, and may access an external apparatus selected from among the external apparatuses searched out.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus configured to establish wireless communication with an external apparatus in response to a communication request from the external apparatus, the information processing apparatus comprising:
   a power supply device that supplies power to each unit of the information processing apparatus;
   an operation device that receives an instruction to turn off a power supply from the power supply device;
   a notification device that provides a notification that the instruction to turn off the power supply is received when the operation device receives the instruction to turn off the power supply from the power supply device;
   a communication interface that establishes communication with the external apparatus; and
   a controller that
      transmits a disconnection request for requesting disconnection of the communication by the communication interface to the external apparatus through the communication interface on a condition that the operation device receives the instruction to turn off the power supply from the power supply device, and
      turns off the power supply from the power supply device after waiting for a predetermined time after the transmission of the disconnection request.

2. The information processing apparatus according to claim 1, further comprising:
   a storage device that stores connection destination information that indicates the external apparatus.

3. The information processing apparatus according to claim 2, wherein
   the controller causes the storage device to store the connection destination information that indicates the external apparatus with which the communication is established by the communication interface.

4. The information processing apparatus according to claim 3, wherein
   when the power supply from the power supply device is turned on, the controller accesses the external apparatus indicated by the connection destination information stored in the storage device through the communication interface.

5. The information processing apparatus according to claim 1, wherein
   the controller causes the notification device to notify of the reception of the instruction to turn off the power supply from the power supply device by the operation device during waiting for the predetermined time.

6. An information processing apparatus configured to establish wireless communication with an external apparatus in response to a communication request from the external apparatus, the information processing apparatus comprising:
   a power supply device that supplies power to each unit of the information processing apparatus;
   an operation device that receives an instruction to turn off a power supply from the power supply device;
   a communication interface that establishes communication with the external apparatus; and
   a controller that
      transmits a disconnection request for requesting disconnection of the communication by the communication interface to the external apparatus through the communication interface on a condition that the operation device receives the instruction to turn off the power supply from the power supply device, and
      turns off the power supply from the power supply device after waiting for a predetermined time after the transmission of the disconnection request, wherein
   when the operation device receives the instruction to turn off the power supply from the power supply device, the controller determines a type of the external apparatus, and on the basis of a result of the determination, determines whether the disconnection request is transmitted or not.

7. An information processing method for an information processing apparatus, the information processing apparatus being configured to establish wireless communication with an external apparatus in response to a communication request from the external apparatus, the information processing method comprising:
   establishing communication with the external apparatus by a communication interface;
   receiving, when the communication is established with the external apparatus, an instruction to turn off a power supply from a power supply device by an operation device;
   transmitting a disconnection request that requests disconnection of the communication by the communication interface to the external apparatus through the communication interface;
   turning off the power supply from the power supply device after waiting for a predetermined time after the transmission of the disconnection request; and
   causing a notification device to notify of reception of the instruction to turn off the power supply from the power supply device by the operation device.

8. The information processing method according to claim 7, further comprising:
   storing, in a storage device, connection destination information that indicates the external apparatus with which the communication is established by the communication interface.

9. The information processing method according to claim 7, further comprising:
   accessing, when the power supply from the power supply device is turned on, the external apparatus indicated by the connection destination information stored in the storage device through the communication interface.

* * * * *